Figure 1:
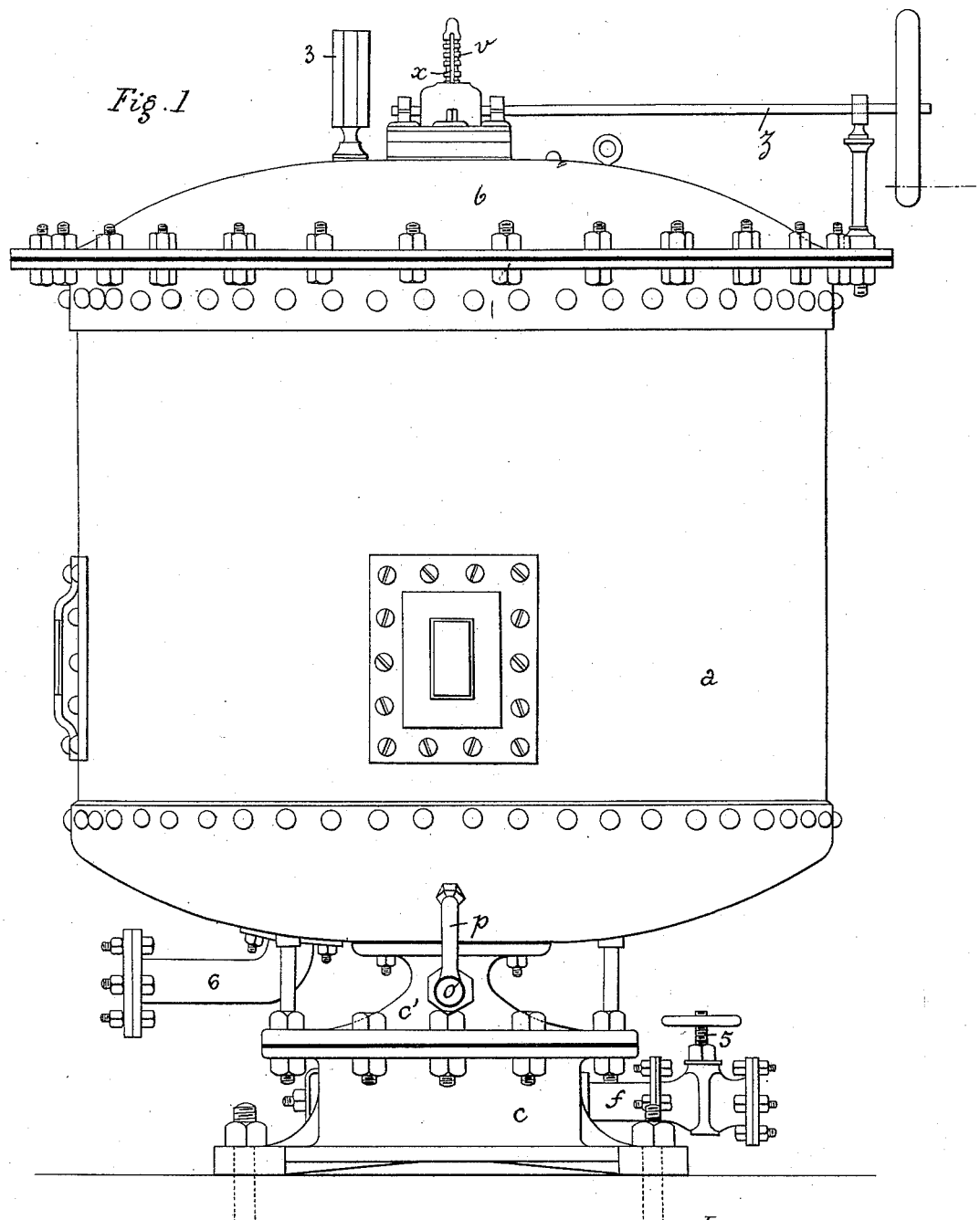

(No Model.) 6 Sheets—Sheet 1.

O. ANDRÉ.
APPARATUS FOR CLEANSING THE BODIES OF FILTERS.

No. 418,148. Patented Dec. 31, 1889.

(No Model.) 6 Sheets—Sheet 3.

O. ANDRÉ.
APPARATUS FOR CLEANSING THE BODIES OF FILTERS.

No. 418,148. Patented Dec. 31, 1889.

(No Model.) 6 Sheets—Sheet 4.
O. ANDRÉ.
APPARATUS FOR CLEANSING THE BODIES OF FILTERS.
No. 418,148. Patented Dec. 31, 1889.

Witnesses
Will T. Norton
H. S. Rohrer

Inventor.
Oscar André
by John J. Halsted & Son
his Attys.

(No Model.) 6 Sheets—Sheet 5.
O. ANDRÉ.
APPARATUS FOR CLEANSING THE BODIES OF FILTERS.
No. 418,148. Patented Dec. 31, 1889.
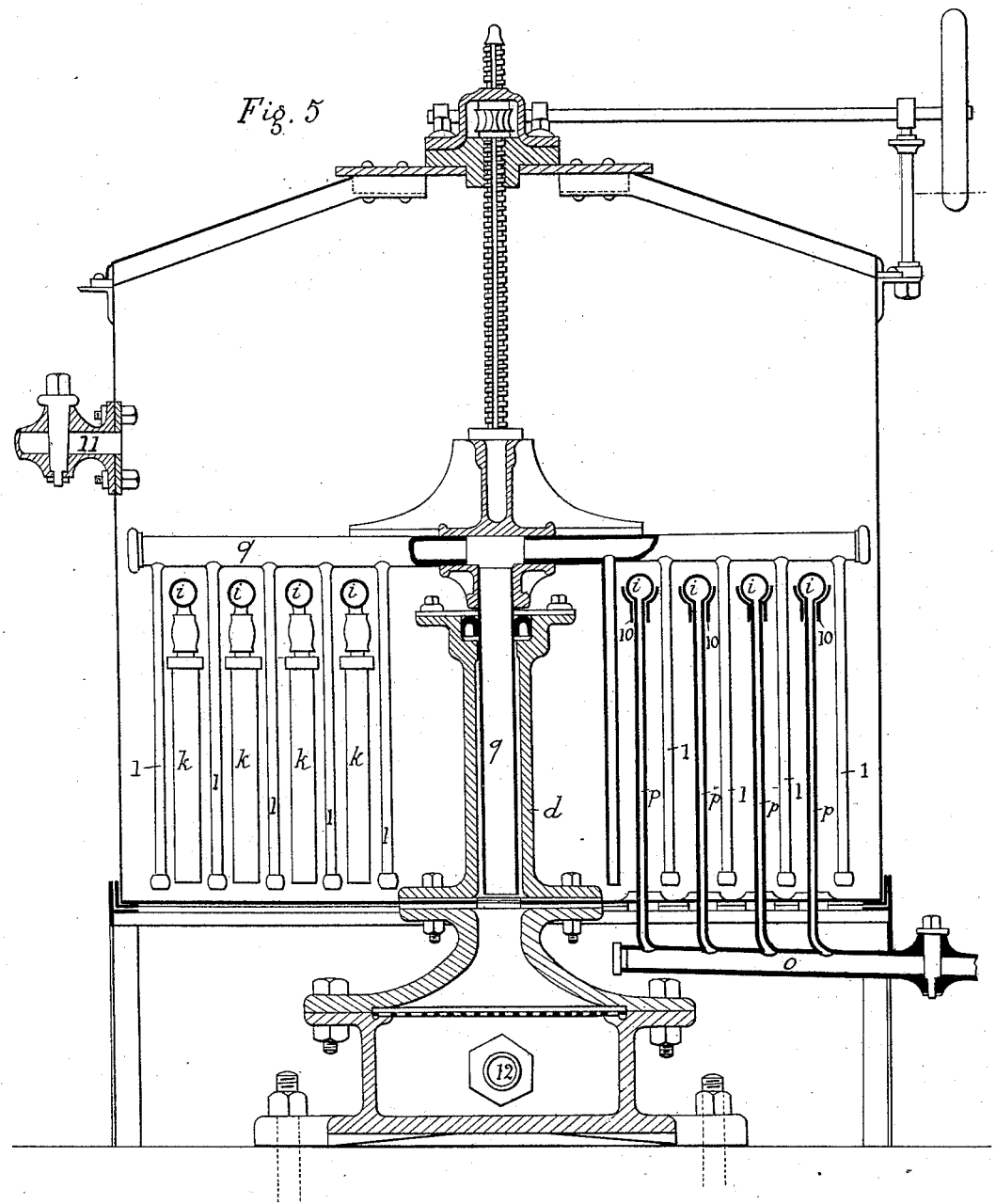

(No Model.) 6 Sheets—Sheet 6.
O. ANDRÉ.
APPARATUS FOR CLEANSING THE BODIES OF FILTERS.
No. 418,148. Patented Dec. 31, 1889.
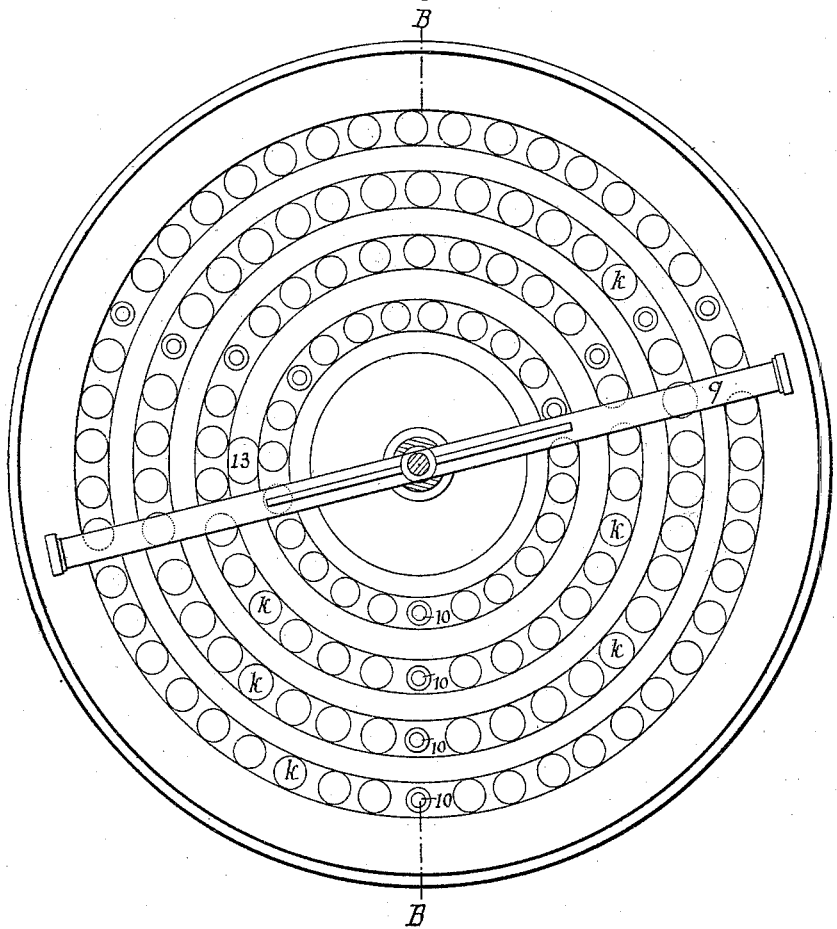

UNITED STATES PATENT OFFICE.

OSCAR ANDRÉ, OF PARIS, FRANCE.

APPARATUS FOR CLEANSING THE BODIES OF FILTERS.

SPECIFICATION forming part of Letters Patent No. 418,148, dated December 31, 1889.

Application filed June 7, 1889. Serial No. 313,432. (No model.) Patented in France May 1, 1888, No. 190,325, and February 23, 1889; in England April 27, 1889, No. 7,050, and in Germany May 4, 1889.

*To all whom it may concern:*

Be it known that I, OSCAR ANDRÉ, engineer, a citizen of the Republic of France, residing in the city of Paris, France, have invented certain new and useful Apparatus for Cleaning the Filtering-Bodies of Chamberland and other Similar Filters, (for which I have obtained Letters Patent in France, dated May 1, 1888, No. 190,325, and an addition thereto dated February 23, 1889, and for which I have filed applications for patents in Great Britain, April 27, 1889, No. 7,050, and in Germany May 4, 1889,) of which the following is a specification.

The rapid clogging of the filtering-surfaces has created serious difficulties in the practical employment of the Chamberland and other similar filters for considerable amounts of water. Moreover, it is a cause of complication of the filtering of fermented liquors and the like.

The cleaning by machinery or by hand of numerous and brittle filtering-bodies is a long and costly operation, and besides it is seldom reliable.

My improvements consist of an apparatus for cleaning the filtering-bodies of filters, such as the Chamberland and other filters.

The process consists in employing water under pressure as a means for cleaning. The water is projected in fine jets against the clogged filtering-bodies, whereby the sediments thereto adhering are removed without in any way affecting or injuring the filtering-bodies. This cleaning operation can be facilitated by causing water, preferably filtered water, or steam or another fluid, to circulate through the filtering-bodies from the inside to the outside. The said water assists in detaching the sediments from the surface of the filtering-bodies.

The apparatus devised for projecting the jets of water for effecting the cleaning of the filtering-bodies has imparted to it a rotary motion, either in the horizontal plane alone or in the vertical and horizontal planes simultaneously, and either continuous, alternate, successive, or combined. If a sufficient amount of water under pressure is at hand to be used for the cleaning operation, a horizontal motion alone will be sufficient; and if the water is to be dealt with sparingly, then a vertical motion combined with a rotary motion will be necessary.

In order that my improvements may be clearly understood, I shall describe them in detail in reference to the accompanying drawings, in which—

Figure 2:
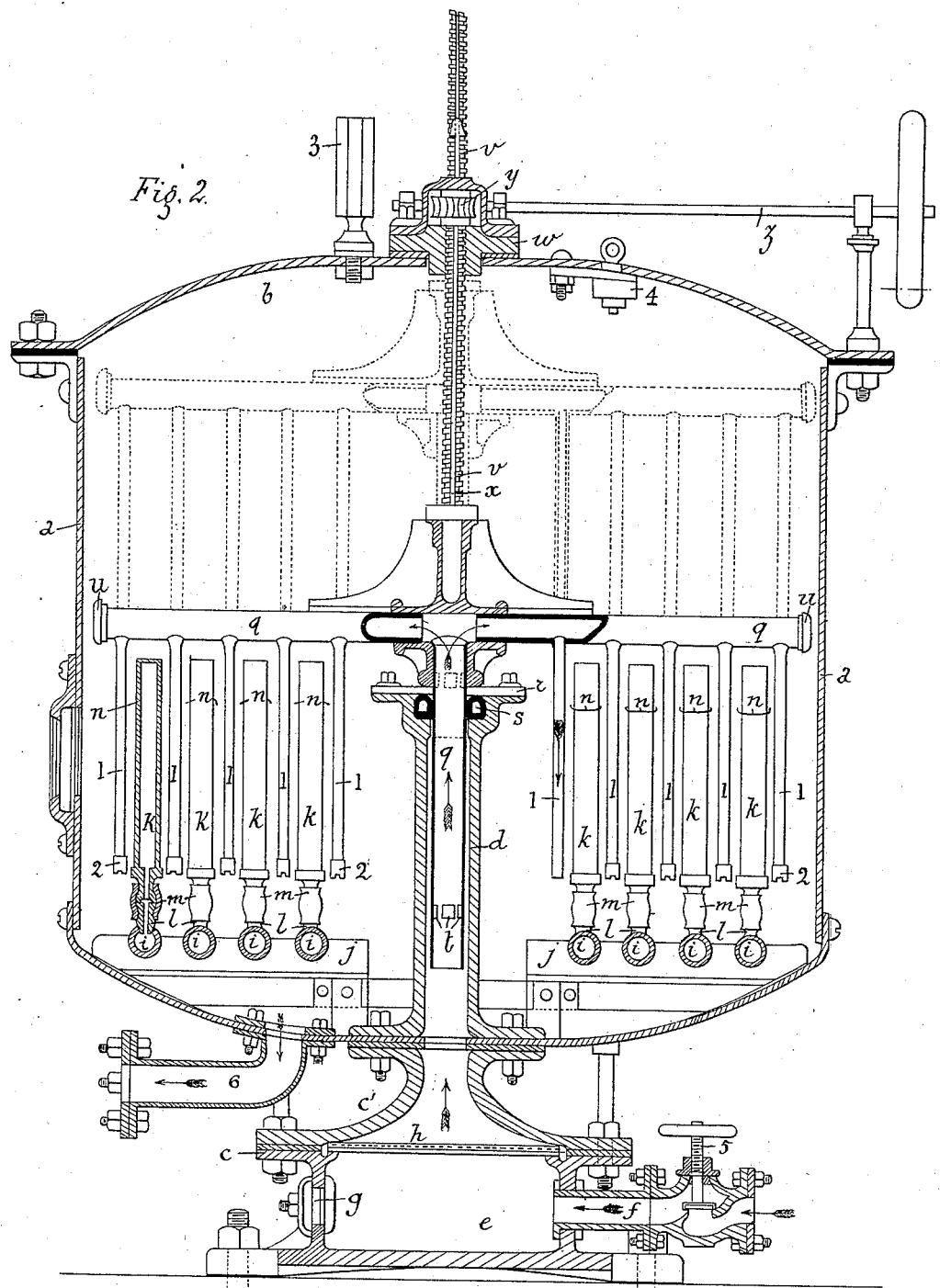
Figure 3:
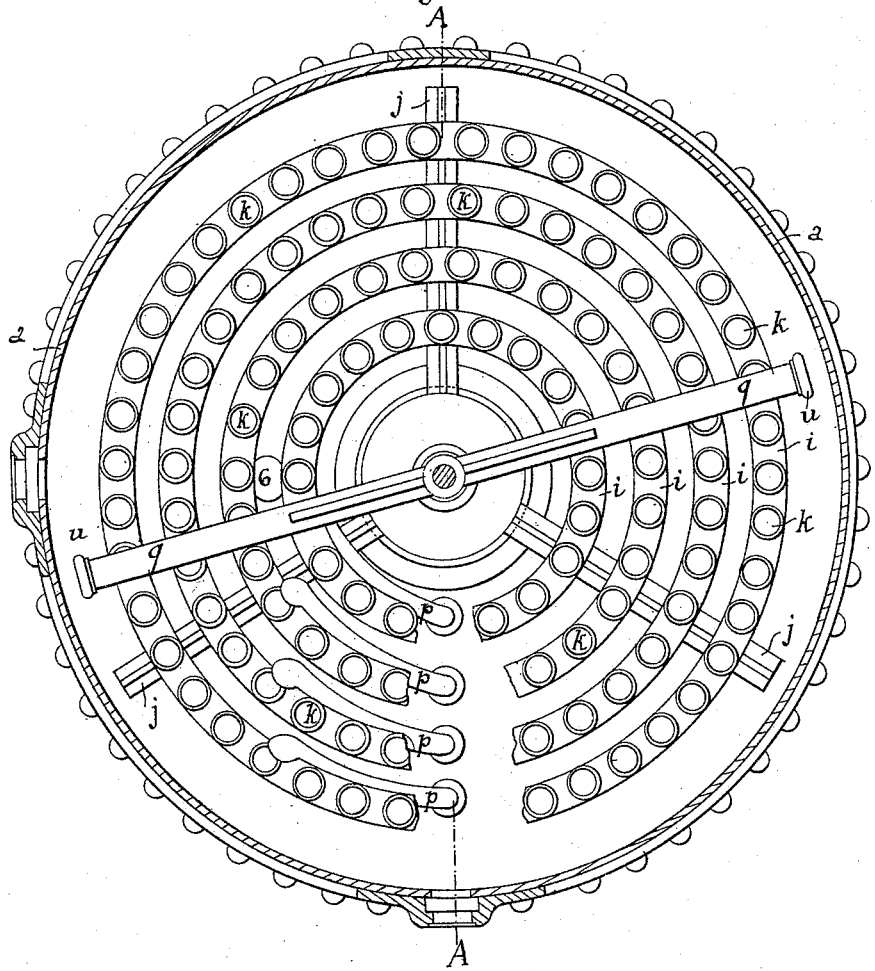
Figure 4:
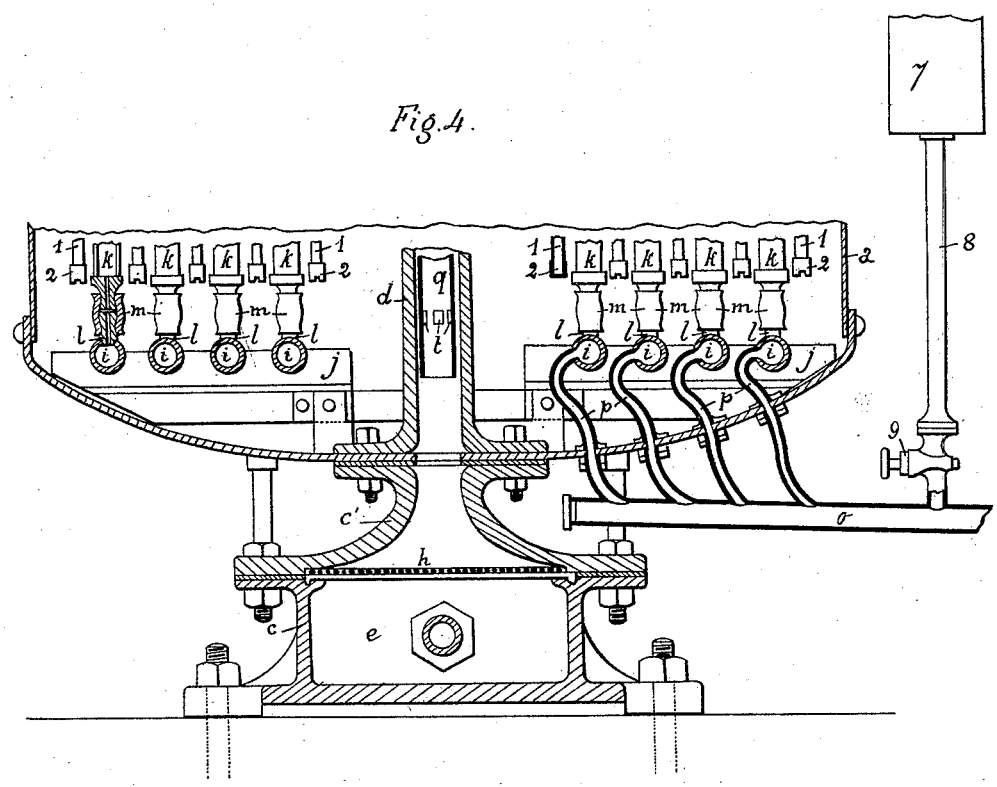

Figures 1, 2, 3, and 4 show an apparatus in accordance with a first arrangement under my invention, while Figs. 5 and 6 are a modification thereof. Fig. 1, Sheet 1, is an elevation. Fig. 2, Sheet 2, is a sectional elevation. Fig. 3, Sheet 3, is a sectional plan of Fig. 2. Fig. 4, Sheet 4, is a partial elevation similar to Fig. 2, but at right angles thereto—that is to say, a section through A A of Fig. 3.

$a$ is a vessel closed at the top by a bolted cover $b$.

$c\ c'$ is the base, and $d$ is a hollow axis leading therefrom. The base $c$ comprises a chamber $e$, into which leads an inlet-pipe $f$ for the water under pressure to be filtered.

$g$ is a door which closes a hole in the base $c$, through which the chamber $e$ can be inspected or cleaned. Across the top of the chamber $e$ is laid a frame-work or a grate connected to a fine wire-cloth $h$, the purpose of which is to retain the coarse impurities which might get into the vessel $a$ and impede the action of the apparatus.

Within the vessel $a$ are a series of circularly-bent pipes $i$, which rest upon radiating horizontal supports $j$. The filtering-bodies $k$ are connected to the pipes $i$ by means of nozzles $l$, secured to the latter, and of lengths of rubber piping $m$. The said bodies $k$ are held vertically by means of connecting-rings $n$. Each of the series of circularly-bent pipes $i$ communicates with a collecting-pipe $o$, Figs. 1 and 4, common to all the pipes $i$, by means of short pipes $p$, Figs. 1, 3, and 4, passing through the bottom of the vessel $a$, any suitable means being resorted to for forming a tight joint. The collector $o$ receives the filtered water, which may be led or forced to any desired place.

The cleaning apparatus is formed of a T-shaped tube $q$, the vertical branch of which enters the hollow axis $d$, after first passing through an annular cap r, acting as a guide for the said branch.

s is a cup-leather for insuring a water-tight joint in the usual manner. The bottom end of the vertical branch of the T-shaped tube q is open, and at some distance from the said end are several holes t, the aggregate area of which is equal to the cross-sectional area of the said tube q. The horizontal branch of the T-shaped tube q is somewhat shorter than the internal diameter of the vessel a, and is closed at each end by a plug u, screwed or otherwise secured. In a line with the vertical branch of the tube q is connected a screw-threaded rod v, which engages a stationary nut w, secured to the cover b of the vessel. The screw-threaded rod has a long groove x, into which engages a key (not shown) fastened to a worm-wheel y, which engages the screw-threaded rod v, and which receives its motion from a worm (not shown) fastened on the driving-shaft z, worked by an ordinary handle. The T-shaped tube q has connected to it a series of pending tubes 1, the lower ends of which are closed by any suitable plug 2. Each plug has two or more holes of such a size, shape, and direction as to project the water to all points of the circumference of each filtering-body k.

3 is a pressure-gage, and 4 is a valve for letting air into the apparatus and closing the latter when full of water.

The operation is as follows: Rotary motion is imparted to the driving-shaft z, so as to cause, by means of the intermediate parts y, w, and v, the T-shaped pipe q to turn and to rise simultaneously until the bottom of the screw-threaded rod v strikes against the under face of the nut w. The cock 5 of the inlet-pipe f is opened and the valve 4 is likewise opened. The water to be filtered rushes into the chamber e, rises into the hollow axis d, and finds its way into the inside of the vessel a by issuing through the holes t of the vertical branch of the T-shaped pipe q, the said holes being over and above the top face of the hollow axis d, as shown in dotted lines in Fig. 2. As soon as the apparatus is filled with water the valve 4 rises and closes automatically. Thereupon the water is forced through the filtering-bodies k and is filtered. The filtered water trickles down inside of the filtering-bodies and runs into the circularly-bent pipes i, Fig. 4, and thence into the collecting-pipe o. After a certain time the amount of filtered water yielded by the filter is reduced in consequence of the filtering-bodies becoming clogged. The filter then requires to be cleaned. For this purpose the cock 5 for the inlet is closed, and a cock (not shown) in the discharge-pipe 6 is opened and the water contained in the apparatus flows out, air being allowed to enter through the valve 4. As soon as the apparatus is empty the cock of the discharge-pipe 6 is closed and the cock 5 is again opened, and at the same time the cleaning apparatus is set in motion by means of the handle connected to the driving-shaft z. The vertical branch of the T-shaped tube q begins to descend and its holes t move into the cup-leather s and gradually into the hollow axis d, whereby the unfiltered water supplied from the inlet-pipe f cannot any longer enter the vessel a, but is obliged to seek another course—viz., the inside of the vertical and horizontal branches of the tube q and into the pending tubes 1, from which the water under pressure is projected in the shape of jets, which strike the filtering-bodies k and remove therefrom the sediments or impurities which have gathered thereon. When the cleaning apparatus has reached its lowermost position, the motion of the driving-shaft z is reversed and the apparatus is brought back to its starting-point. (Shown in dotted lines in Fig. 2.) At this moment the cock of the discharge-pipe 6 is closed and the unfiltered water again issues from the holes t into the apparatus and the filtering operation is continued as soon as the valve 4 is closed again.

If desired, or if the filter has been operating on liquids which leave a sediment of a viscous character upon the surface of the filtering-bodies, the cleaning operation can be facilitated by causing, at the same time as the cleaning apparatus is acting, water to be forced through the filtering-bodies from the inside to the outside, so as to aid in detaching the impurities from the outer surface of the filtering-bodies. The said water, which should preferably be filtered water, can be taken from the collecting-pipe o and be made to fill a reservoir 7, Fig. 4, provided with a pipe 8 and cock 9. The reservoir 7 should be placed at a sufficiently high level to yield the requisite head or pressure and find its way through the thickness of the filtering-bodies k from the inside to the outside.

Just before proceeding to clean the filtering-bodies k the cock (not shown) in the collecting-pipe o is closed and the cock 9 is opened, whereby the reservoir 7 soon gets filled with water. When the reservoir 7 is full, the cleaning operation is proceeded with as formerly.

In case the water to be filtered should enter the apparatus at a pressure which is sufficient for the filtering operation to take place, but insufficient for projecting the jets of water with the required force for cleaning the filtering-bodies, then a force-pump of any suitable kind can be used for effecting the cleaning operation. In such case the base c would have an extra opening (not shown) for connecting the pipe by which the water is forced from the pump.

Figs. 5 and 6 show a modification of the apparatus differing from the arrangement shown in Figs. 1, 2, 3, and 4 in this, that instead of filtering by pressure the filtering operation is effected by suction. Fig. 5 is an elevation in section on the line B B, Fig. 6, and Fig. 6 is a plan in section of Fig. 5. In this modification a suction-pump draws the liquid to be filtered through the filtering-bodies $k$, and the filtered water of all the said bodies $k$ enters the circularly-bent pipes $i$, which, instead of resting on supports, as in Fig. 2, are held up by supports 10 10 10 10 and by means of pipes $p\ p\ p\ p$, acting likewise as supports and leading into the collecting-pipe $o$, to which the suction-pump is connected. The cleaning apparatus is substantially the same as the one previously described, and need not be again described.

11 is the inlet for the water to be filtered, and 12 is the inlet for the water to be used for the cleaning operation.

13, Fig. 6, is the opening at the bottom of the vessel $a$, to which is connected the discharge-pipe. (Not shown.)

The vertical branch of the T-shaped pipe $q$, guided by the hollow axis $d$, receives the water from the inlet 12, which water does not, as in the foregoing arrangement, issue by holes $t$ into the inside of the apparatus. It will likewise be understood that the cleaning operation can in this modification also be assisted by forcing water through the filtering-bodies from the inside to the outside. This may be effected by forcing filtered water or other liquid through the suction-pipe $o$. If the amount of water under pressure is considerable, the number of holes in the pending tubes 1 may be increased and extend over the whole length of the said tube, if desired, in which latter case the cleaning apparatus need but receive a rotary motion alone.

In other respects the apparatus shown in Figs. 5 and 6 is substantially the same as that shown in Figs. 1, 2, 3, and 4.

The apparatus may be made in the shape of a half or quarter circle instead of having the shape of a cylindrical body.

The circularly-bent pipe $i$ can be cleaned by being removed from the inside of the apparatus and then dipped into acidulated water. The filtering-bodies $k$ may likewise have boiling water or acidulated water projected against them while in the apparatus.

I claim—

1. The combination, for cleaning the filtering-bodies $k$, arranged in concentric series, of the system of perforated tubes 1, pendent from a horizontal pipe $q$, said tubes and pipe being adapted to revolve and also to rise simultaneously, as and for the purposes set forth.

2. In combination with the base $d$, its cup-leather $s$, and cap $r$, the T-shaped tube $q$, carrying the perforated tubes 1 and provided with the holes $t$, for the purpose set forth, and fitted water-tight in the base, all as set forth.

3. In combination, the concentric rows of filtering-bodies $k$, secured to concentric rows of pipes $i$, as set forth, a common collector $o$, into which said concentric rows discharge, and a cleaning device adapted to be moved between the concentric rows, all substantially as set forth.

In witness whereof I have hereunto signed my name in the presence of two subscribing witnesses.

O. ANDRÉ.

Witnesses:
R. H. BRANDON,
C. BLUNDELL.